United States Patent [19]

Alsina

[11] 4,185,917
[45] Jan. 29, 1980

[54] FRONT WHEEL MIRROR MOUNTING DEVICE ALIGNMENT APPARATUS

[75] Inventor: Pierre A. Alsina, Rochester, N.Y.

[73] Assignee: SpinOptic, Inc., Hornell, N.Y.

[21] Appl. No.: 859,466

[22] Filed: Dec. 12, 1977

[51] Int. Cl.² ................. G01B 5/255; G02B 5/08
[52] U.S. Cl. .................. 356/155; 33/203.19; 33/336; 248/481
[58] Field of Search ............ 356/155; 33/203, 203.18, 33/203.19, 336; 350/288, 307; 248/481

[56] References Cited

U.S. PATENT DOCUMENTS

| | | | |
|---|---|---|---|
| 2,475,502 | 7/1949 | Holmes | 356/155 |
| 2,641,957 | 6/1953 | Vandermeer | 356/155 |
| 3,204,524 | 7/1965 | Moore | 350/307 |
| 3,552,700 | 1/1971 | Mitchell | 33/203.18 |
| 3,758,213 | 9/1973 | MacPherson et al. | 356/155 |
| 3,879,112 | 4/1975 | Hickey | 350/288 |
| 3,892,042 | 7/1975 | Senften | 356/155 |
| 3,951,551 | 4/1976 | MacPherson | 356/155 |
| 4,011,659 | 3/1977 | Hövallius | 33/203 |
| 4,101,205 | 7/1978 | Bös | 248/481 |

Primary Examiner—John K. Corbin
Assistant Examiner—R. A. Rosenberger
Attorney, Agent, or Firm—Shlesinger, Fitzsimmons & Shlesinger

[57] ABSTRACT

A mirror is mounted in the open end of a circular housing by means of a universal joint formed by a stud which projects from the rear of the mirror into a spherically-shaped knuckle joint that is seated at diametrally opposite sides in a pair of "Teflon" ring bearings carried by two plates that are held over opposite sides of the knuckle by a pair of adjusting screws which can be selectively tightened or loosened to control the resistance to movement of the mirror universally about the center of the joint. The housing is releasably attachable to the hub cap of a front wheel by a plurality of clamps adjustably mounted on arms which project radially from the housing. In use pressure can be applied to the face of the mirror, during rotation of the wheel, to effect coarse adjustment of the mirror into an operating position normal to the axis of rotation of the wheel, and when the wheel is stopped, fine adjustment of the mirror can be effected by screws that are mounted on the housing around the periphery of the mirror.

7 Claims, 9 Drawing Figures

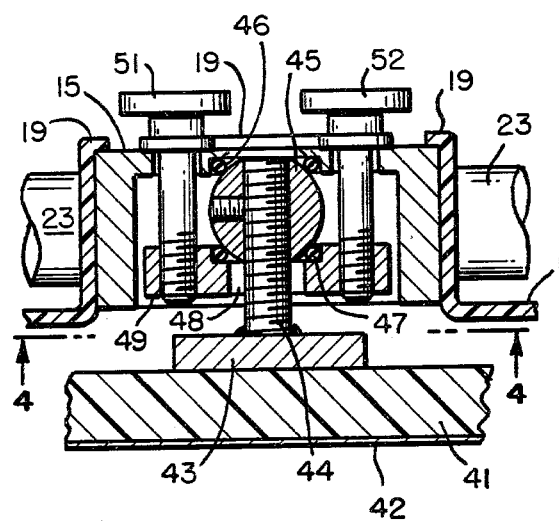
FIG. 3
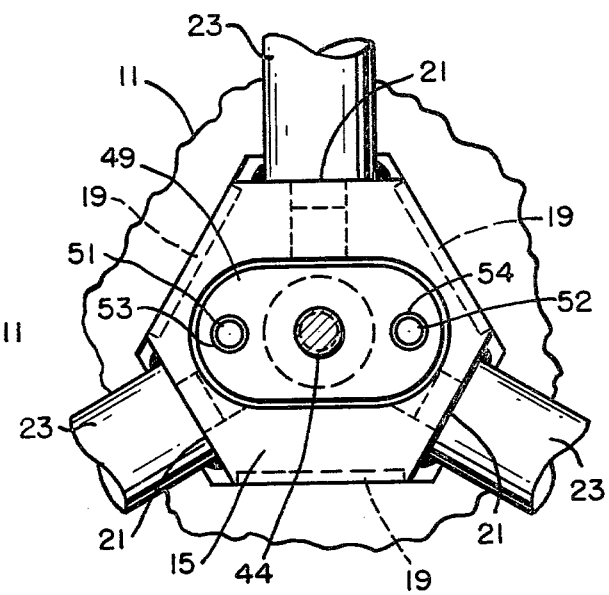
FIG. 4
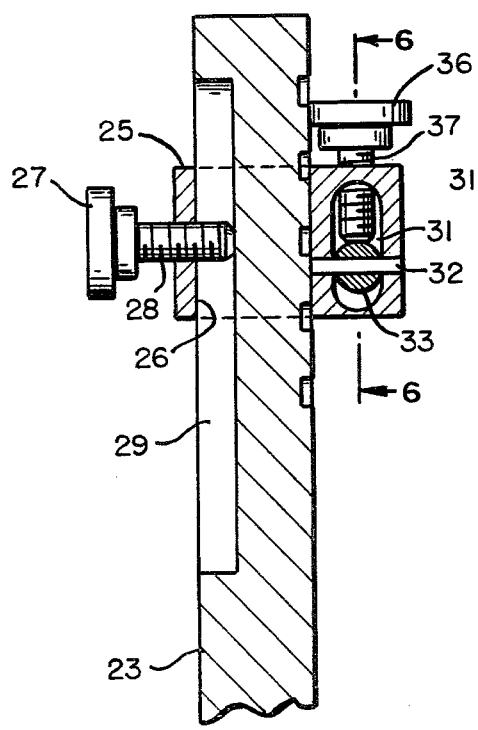
FIG. 5
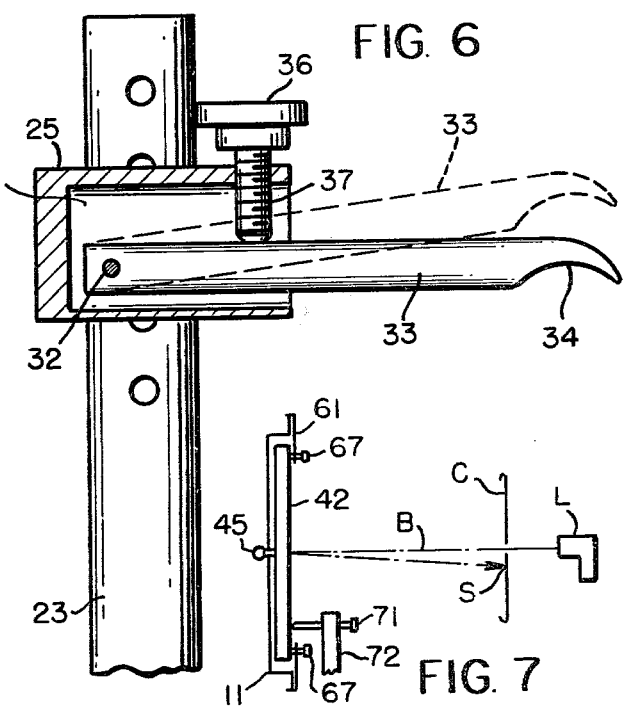
FIG. 6
FIG. 7
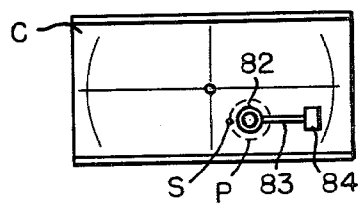
FIG. 8

FRONT WHEEL MIRROR MOUNTING DEVICE ALIGNMENT APPARATUS

This invention relates to apparatus for aligning the front wheels of automotive vehicles, and more particularly to an improved device for mounting on the front wheel of a vehicle a mirror or reflecting surface which forms part of the alignment apparatus.

There are various known techniques for checking the alignment of the front wheels of an automobile. Certain apparatus, such as shown for example in U.S. Pat. Nos. 3,758,213 and 3,951,551, utilize spaced light sources between which the front wheels of a vehicle are positioned so that beams of light are directed onto reflecting surfaces, which are removably mounted on the wheels. Each surface reflects a beam of light onto a chart which denotes, for example, the degree of toe in or toe out of each wheel, the amount of its camber, etc. In this way it is possible to measure the degree to which the front wheels are out of alignment, and enables one promptly to adjust the wheels until they are satisfactorily aligned.

When using alignment apparatus of the type described, it is necessary that the reflecting surface on each wheel be positioned in a plane that extends at right angles to the axis of rotation of the wheel, so that the reflected beam will provide a correct reading of the camber, toe, etc. It is necessary, therefore, that the reflecting surface be adjustable relative to the wheel.

To adjust the surface into its proper position, it is customary to rotate the wheel while the mirror or reflecting surface is mounted thereon, so that the beam of light that falls on the reflecting surface will be reflected onto the face of the above-noted chart. If the reflecting surface is not disposed in a plane normal to the axis of rotation of the wheel, the reflected beam forms a revolving point of light on the face of the chart. The mirror surface is then adjusted until the last-named point becomes stationary, which indicates that the reflecting surface is now positioned in a plane normal to the axis of rotation of the wheel.

Prior mounting devices for reflecting surfaces or mirrors of the type described have not proved to be fully satisfactory, since as a general rule, they have been very difficult to adjust to the point where the reflected beam of light forms a stationary spot on the chart. Moreover, prior such devices have been rather expensive to manufacture and difficult to calibrate.

It is an object of this invention, therefore, to provide an improved mirror mount of the type described, which can be readily mounted and dismounted on the front wheel of an automotive vehicle for use with apparatus of the type described, regardless of the particular size of the wheel which is being checked.

Another object of this invention is to provide an improved mounting device of the type which enables the associated mirror or reflecting surface readily to be adjusted into the desired operative position in which it is located in a plane normal to the axis of rotation of the wheel upon which it is mounted.

A further object of this invention is to provide a device of the type described which can be selectively and removably mounted in an operative position either on the hub cap of a tire-wheel, or on the rim of the wheel itself.

Still a further object of this invention is to provide an improved mirror mount of the type described which can be utilized both with the dynamic type of alignment apparatus, in which the front wheels are positively rotated during mirror adjustment, and also with the static-type alignment apparatus in which the front wheels are manually rotated during mirror adjustment.

Other objects of the invention will be apparent hereinafter from the specification and from the recital of the appended claims, particularly when read in conjunction with the accompanying drawings.

In the drawings:

FIG. 3 is a fragmentary sectional view taken on a scale greater than that shown in FIG. 2, the view being taken along the line 3—3 in FIG. 1 looking in the direction of the arrows;

FIG. 4 is a fragmentary sectional view taken along the line 4—4 in FIG. 3 looking in the direction of the arrows;

FIG. 5 is an enlarged fragmentary sectional view taken on a scale greater than that shown in FIG. 2, and along the line 5—5 in FIG. 2 looking in the direction of the arrows;

FIG. 6 is a fragmentary sectional view taken along the line 6—6 in FIG. 5 looking in the direction of the arrows;

FIG. 7 is a diagrammatic side elevational view showing how the mirror portion of the device disclosed herein is adapted to be calibrated for use with laser beam alignment apparatus; and FIG. 8 is a front elevational view of the chart which is used while calibrating the mirror portion of this device.

Figure 1:
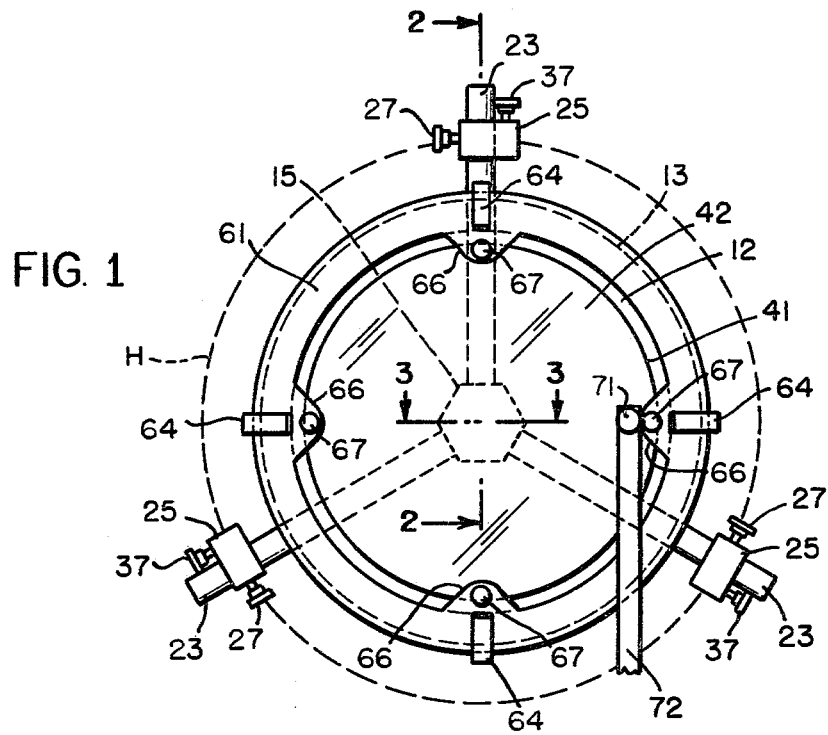
FIG. 1 is a front elevational view of a mirror and novel mounting device therefor which forms part of front wheel alignment apparatus made according to one embodiment of this invention, part of a mirror locating element being shown fragmentarily and in elevation.

Referring now to the drawings by numerals of reference, 11 denotes a circular, generally dish-shaped housing having therein a shallow, circular recess 12, and having around its periphery a laterally projecting, circumferential flange 13. Secured in a six-sided central opening in the bottom of housing 11 is a generally hexagonally-shaped housing or casing 15 having an open end 16 (FIGS. 2 and 3) which is approximately flush with the bottom of housing 11. Three sides of housing 15 (every other side thereof) are fixed to three right-angular tabs or flanges 19 (FIGS. 2-4), which project laterally from the bottom of housing 11 at 120° intervals about its central opening, thereby to fix the small housing 15 centrally in the bottom of housing 11.

Welded or otherwise secured at their inner ends to the three remaining sides 21 (FIG. 4) of the housing 15 are three, identical, radially projecting rods or arms 23. Slidably mounted on the outer end of each arm 23 for longitudinal adjustment thereon radially of the axis of housing 11 is a clamp support 25. Adjacent one end thereof each support has therethrough a circular bore 26 (FIG. 5) for slidably accommodating the associated arm 23. On each arm 23 an adjusting nut 27 has a threaded shank 28, which threads through the associated clamp support 25, and into an elongate groove 29, which is formed longitudinally of each arm 23 adjacent its outer end.

Each clamp support 25 projects slightly beyond one side of the associated arm 23 and has therein an elongate slot or blind bore 31 which extends at right angles to the axis of the associated arm 23. Pivotally mounted at its inner end in each slot 31 by means of a pivot pin 32, which extends between opposite sides of the slot, is a clamp 33 (FIGS. 2, 5 and 6) having a hooked or slightly curved outer end 34. Mounted on each clamp support 25 is a second adjusting nut 36, which as a threaded shank 37 that threads into the slot 31 in the support to engage the upper surface of the associated clamp 33 intermediate its ends.

Adjustably mounted in the circular recess 12 in the face of housing 11 is a generally disc-shaped reflecting member 41, such as a mirror or the like, which has a plane reflecting surface 42 facing away from the housing 11. Welded or otherwise secured at one end to a mounting plate 43, which is fastened to the rear face of member 41 coaxially thereof, is an externally threaded stub 44. This stud threads into one end of an axial bore that is formed through a spherical knuckle or universal joint 45, which is adjustably seated at one end on a "Teflon" ring bearing 46 that is mounted in a circular groove in the bottom or closed end of casing 15.

Knuckle 45 is held snugly against the bearing 46 by another "Teflon" ring bearing 47, which is carried in a counterbore formed at one end of a bore 48 that extends centrally through a generally oval-shaped bracket 49. This bracket surrounds the stud 44 adjacent the open end of casing 15, and is positioned over the end of the knuckle 45 remote from the bearing 46. Two adjusting screws 51 and 52 have shanks which extend rotatably through a pair of spaced openings in the closed end of casing 15, and along opposite sides of knuckle 45 to the bracket 49, where they thread at their inner ends into registering apertures 53 and 54, respectively, in the bracket.

Figure 2:
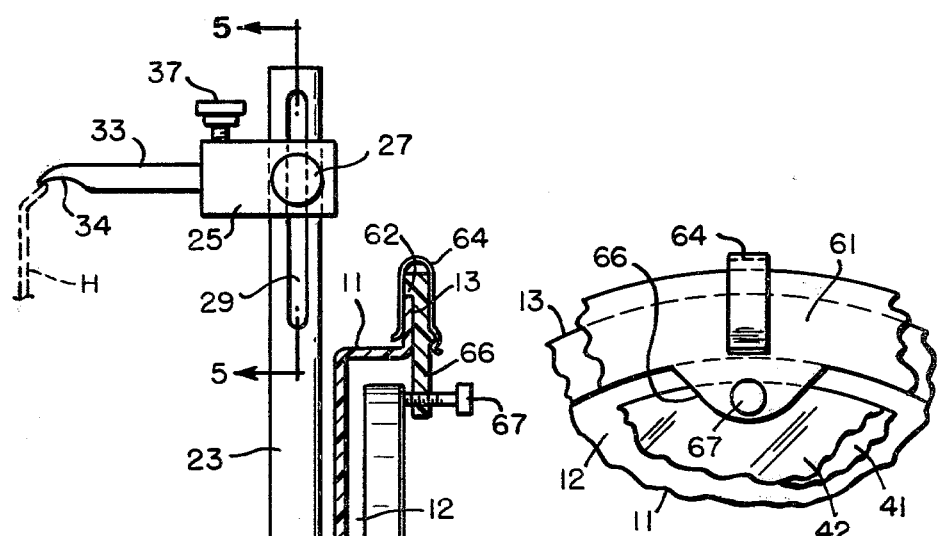
FIG. 2 is an enlarged, fragmentary sectional view taken along the line 2—2 in FIG. 1 looking in the direction of the arrows.
Figure 1A:
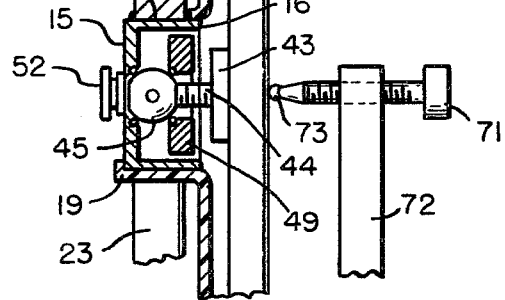
FIG. 1A is a greatly enlarged fragmentary view of a portion of the upper edge of the mounting device shown in FIG. 1.

As shown more clearly in FIGS. 1 and 2, the reflecting member 41 has a diameter slightly smaller than the diameter of the recess 12 in housing 11, so that the annular wall portion of housing 11 is radially spaced slightly from the peripheral surface of member 41. Rotatably mounted on the flange 13 of housing 11 is an annular, fine adjustment and locking collar 61, which has adjacent its outer periphery a laterally projecting, circumferential flange portion 62, which is seated over the outer rim of the housing flange 13. Collar 61 is held frictionally against the face of flange 13 by a plurality (four in the embodiment illustrated) of spring clips 64, each of which has one leg engaged against the outer surface of collar 61, and the other leg seated against the back of the housing flange 13. Threaded into each of four, arcuate lugs 66, which project from the inner peripheral surface of collar 61 at ninety degree intervals thereabout, in an adjusting nut 67, the inner end of which is engageable with the reflecting surface 42 on member 41.

In use, the device is adapted to be mounted on the front wheel of a vehicle by loosening the screws 27 to allow the clamp supports 25 to be shifted radially on the arms 23 until the hooked ends 34 of the three clamps 33 are engaged over the rim of the hub H of the wheels as shown for example in FIG. 2, wherein part of the hub H is illustrated in broken lines. During this adjustment the threaded shanks 28 of the screws 27 are slidable in the slots 29 in the arms 23, and also prevent undesirable rotation of the supports 25 about the arms 23. When the supports 25 are properly positioned, the screws 27 are threaded inwardly to lock the supports 25 against further movement on the arms 23, and the screws 36 are then adjusted to force the hooked ends 34 of the clamps 33 firmly around the rim of the hub H.

This operation securely clamps the housing 11 onto the wheel with the reflecting surface 42 facing in the direction of a light source L (FIG. 7), which is to be used during the alignment operation. This light source L may form part of any conventional alignment apparatus, and by way of example, may be a laser of the type disclosed in U.S. Pat. No. 3,758,213. Moreover, while it has been suggested that housing 11 be clamped onto the hub cap of a wheel, it will be readily apparent that, if desired, the hub cap could be removed and the clamps 33 could be positioned to have their hooked ends 34 engage securely over the rim of the wheel upon which the front tire of the vehicle is mounted. In either case, of course, the housing will be secured to the front wheel for rotation therewith whenever the wheel is rotated.

As is known by those skilled in the art, before any alignment measurements can be made it is necessary first to adjust the reflecting member 41 so that its surface 42 will be disposed in a plane that extends at right angles to the axis of rotation of the associated wheel. Therefore, after the housing 11 has been mounted on the front wheel, the wheel is rotated, so that the beam of light B (FIG. 7), which is directed by source L onto surface 42, will be reflected back toward the light source, and onto the face of a conventional alignment chart C, which is employed in apparatus of this type (see for example chart 60 in U.S. Pat. No. 3,758,213). This type of chart is used to denote the amount of toe in, camber, etc. of the associated wheel. If the surface 42 is not disposed in the desired plane, the reflected beam of light will form on the face of the alignment chart a spot of light S (FIGS. 7 and 8), which will revolve in a circular path P (broken lines in FIG. 8) about a point which corresponds to the axis of rotation of the wheel. To align the surface 42 in the desired plane, it is necessary to cause this spot S of light on the chart to remain stationary when the wheel upon which the housing 11 is mounted is rotated.

Assuming initially that surface 42 is not in the desired plane, the screws 51 and 52 are adjusted to draw the bracket 49 into a position in which its bearing 47 is urged against the knuckle 45 with sufficient force to hold the knuckle frictionally against universal movement, but at the same time to allow the member 41 to be adjusted universally by the application of pressure against the reflecting surface 42 of member 41. Also at this time the adjusting screws 67 are backed off slightly to disengage surface 42 so that member 41 can be adjusted slightly and universally about the center of knuckle 45.

The member 41 may now be adjusted into the approximate desired position through the use of a coarse adjusting device represented in FIGS. 1, 2 and 7 by the screw 71, which is adjustably threaded into the upper end of a vertical supporting arm 72, so that a generally spherically spaced head 73 (FIG. 2) on the inner end of screw 71 is engageable with the reflecting surface 42 at a point spaced slightly inwardly from the outer peripheral surface of member 41. The arm 72 is supported in any conventional manner at its lower end, so that during rotation of the wheel upon which the housing 11 is mounted, the screw 71 is held stationary, and approximately in a horizontal position as illustrated in FIG. 2. While the wheel is rotating, the inner end 73 of the screw is advanced into engagement with the reflecting surface 42, and thereafter screw 71 is slowly threaded outwardly on the arm 72 so that its point 73 eventually disengages surface 42. During withdrawal of the point 73 the axis of the rotating member 41 slowly approaches the approximate point where it becomes coaxial of the axis of rotation of the wheel, and the point where the surface 42 will be disposed at right angles to the axis of rotation of the wheel. When point 73 has been fully disengaged from surface 42, the spot on the chart formed by the reflected beam may still be revolving slightly.

To effect fine tuning, a small wire loop 82 (FIG. 8), which is supported by a rigid arm 83 on a small permanent magnet 84 that is magnetically attached to the chart face, is adjusted on the face of the chart until it is located concentrically of path P. The rotation of the wheel is then stopped so that the reflected point of light becomes stationary spot S on the face of the chart. The relative clockwise position of spot S around the loop 82 (FIG. 8) is then noted (e.g. at nine o'clock), and the collar 61 is rotated relative to the housing 11 until one of the axes defined by the two pairs of opposed adjusting screws 67 coincides as nearly as possible with a mirror image of a line joining the center of loop 82 and the spot of light S on the face of the chart. As shown in FIG. 8, for example, assuming spot S is at nine o'clock relative to the center of loop 82, the spot and the center of the loop lie on a horizontal axis. Therefore the collar 61 would be rotated until the centers of a pair of opposed screws 67 were in a horizontal plane.

After adjusting collar 61 as noted above, only one of the four screws 67 need be adjusted to shift the reflected spot of light to the center of loop 82, which corresponds to the axis of rotation of the wheel. At this point the reflecting surface 42 will be disposed in a plane which extends at right angles to the axis of rotation of the wheel. The alignment of the front wheel can now be effected in the usual manner.

From the foregoing it will be apparent that applicant has devised an extremely simple and effective means of removably mounting a reflective surface on the front wheel of any type of automotove vehicle, and for quickly and accurately effecting adjustment of the reflecting surface into the operating position in which it will be disposed at right angles to the axis of rotation of the wheel upon which it is mounted. By using both coarse and fine adjusting devices it is possible to bring the reflected beam of light into a stationary position on the associated chart in a very brief period of time. For example, by using the rotatable collar 61 and its four adjusting screws 67, it is possible using loop 82, to place collar 61 in a position in which the adjustment of one screw 67 will be required to effect the final, fine adjustment of surface 42. Also, the adjustable clamp supports 25 enable the device to be mounted on almost any type of vehicle, regardless of the wheel size; and, moreover, the advantage of the clamps 34 is that they obviate the need for removing the vehicle hub cap, and instead permit the device to be mounted directly onto the hub caps, if desired, or onto the rim of the tire itself.

Still another advantage of the herein disclosed invention is that the reflecting member 41 is mounted for universal movement by the novel mounting means represented by the knuckle 45, which is adjustably clamped between the ring bearings 46 and 47. As a consequence of this construction, once the reflecting member 41 has been adjusted into a position in which it is disposed coaxially of a particular wheel, thereafter the necessary adjustments which will be required to place its reflecting surface 42 in the desired operating position, will be minimized. Moreover, by mounting the reflecting member 21 for universal movement about the single joint 45, it is possible to utilize the centrifugal forces which are created during the rotation of the wheel upon which the device is mounted, to help the screw 71 in adjusting the member 41 into its desired operating position. In addition, by tightening screws 51 and 52 after surface 42 has been adjusted into its desired position, proper alignment of the mirror surface will be maintained throughout subsequent alignment operations.

While the invention has been illustrated and described in connection with only a single embodiment thereof, it will be apparent it is capable of still further modification, and that this application is intended to cover any such modifications which fall within the scope of one skilled in the art of the appended claims.

Having thus described my invention, what I claim is:

1. A device for mounting a reflecting surface on the wheel of an automotive vehicle, comprising
   a housing having an integral hub projecting from one side thereof,
   a plurality of rigid arms fixed to and projecting radially outwardly from said hub at angularly spaced points about the center of said hub,
   a plurality of clamps mounted on said arms for adjustment longitudinally thereof, and having laterally projecting hook-shaped portions engageable releasably over the rim of a wheel of a vehicle removably to secure said housing against rotation on said wheel, and approximately centrally thereof, and
   means mounting a reflecting member on the side of said housing opposite said hub for universal adjustment relative to said housing about a point located on the centerline of said hub,
   said member having thereon a plane reflecting surface facing away from said housing,
   a plurality of adjusting elements on said housing engageable with said member at a plurality of points angularly spaced about the axis of said hub, and operable for adjusting said member about said point, and
   means mounting said adjusting elements on said housing for rotational adjustment around the outside of said housing, thereby to change the points where said elements engage said member.

2. A device as defined in claim 1, wherein
   a ring is mounted to rotate around the outside of said housing, and
   said adjusting elements are adjustably threaded into said ring and are engageable at their inner ends with the reflecting surface of said member adjacent the peripheral edge thereof.

3. A device as defined in claim 2, wherein there are four of said screws threaded adjustably into said ring about spaced parallel axes which extend parallel to the axis of said ring, and which are equi-spaced angularly from each other about said axis.

4. A device as defined in claim 1, wherein said mounting means comprises
   a spherically-shaped element mounted in said hub with its center defining said point,
   a stem fixed at one end to said hub and at its opposite end to said reflecting member on the side thereof opposite said reflecting surface, and means for frictionally securing said element against rotation about its center relative to said housing.

5. A device as defined in claim 4, wherein the last-named means comprises a pair of resilient O-rings engaging diametrally opposite sides of said element, and means for adjusting the pressure between said element and said O-ring comprising a pair of screws threaded into said hub and adjustable relative thereto selectively to increase or decrease the pressure with which said O-rings are held against said element.

6. A device for mounting a reflecting surface on the wheel of an automotive vehicle, comprising a housing, means on one side of said housing for releasably attaching the housing to the wheel of a vehicle generally centrally thereof, means mounting a circular reflecting member on the opposite side of said housing for universal adjustment about a point disposed rearwardly of said member, said member having on the face thereof a plane reflecting surface facing away from said housing, an adjusting ring rotatable on said housing coaxially around the outside of said reflecting member, and at least two adjusting screws adjustably threaded through said ring at diametrally opposite sides thereof parallel to the axis of said member, and engageable at their inner ends with the reflecting surface on said member adjacent the peripheral edge thereof.

7. A device as defined in claim 6, wherein there are four of said adjusting screws threaded into said ring at 90° intervals about its axis.

* * * * *